United States Patent [19]

Hiraoka et al.

[11] Patent Number: 5,044,224
[45] Date of Patent: Sep. 3, 1991

[54] CAMSHAFT

[75] Inventors: Takeshi Hiraoka, Saitama; Shunsuke Takeguchi, Tochigi; Satoshi Kawai, Kuki, all of Japan

[73] Assignee: Nippon Piston Ring Co., Ltd., Tokyo, Japan

[21] Appl. No.: 603,307

[22] Filed: Oct. 25, 1990

Related U.S. Application Data

[62] Division of Ser. No. 347,224, May 4, 1989.

[30] Foreign Application Priority Data

May 23, 1988 [JP] Japan .................................. 63-66898

[51] Int. Cl.$^5$ .............................................. F16H 53/00
[52] U.S. Cl. ........................................ 74/567; 403/355
[58] Field of Search ................. 74/567, 568 R, 569, 74/595-598; 123/90.6; 29/432, 520, 525, 156.4 R; 403/373, 374, 355, 378

[56] References Cited

U.S. PATENT DOCUMENTS

| | | | |
|---|---|---|---|
| 146,393 | 1/1874 | Joyce | 403/355 |
| 261,968 | 8/1882 | Taylor | 403/355 X |
| 1,337,765 | 4/1920 | McGuckin | 403/355 |
| 2,550,061 | 5/1951 | Shields et al. | 403/355 X |
| 2,893,298 | 7/1958 | Averette | 403/355 X |
| 3,022,073 | 2/1962 | Miller | 403/355 X |
| 3,077,334 | 2/1963 | Rubio et al. | 403/355 |
| 3,437,003 | 4/1969 | Rhoads | 403/355 X |
| 3,690,957 | 9/1972 | Thompson | 74/567 X |
| 4,462,638 | 7/1984 | Denbesten | 403/378 X |
| 4,620,356 | 11/1986 | Maus et al. | 29/432 |
| 4,687,425 | 8/1987 | Takano et al. | 74/567 X |
| 4,767,233 | 8/1988 | Erickson | 403/355 X |

FOREIGN PATENT DOCUMENTS

| | | | |
|---|---|---|---|
| 168697 | 12/1950 | Austria | 74/567 |
| 141990 | 3/1917 | Fed. Rep. of Germany | 403/355 |
| 341698 | 11/1919 | Fed. Rep. of Germany | 403/355 |
| 385806 | 8/1922 | Fed. Rep. of Germany | 403/355 |
| 671920 | 2/1939 | Fed. Rep. of Germany | 403/355 |
| 829975 | 12/1951 | Fed. Rep. of Germany | 74/567 |
| 2412330 | 8/1975 | Fed. Rep. of Germany | 123/90.6 |
| 2706021 | 8/1977 | Fed. Rep. of Germany | 123/90.6 |
| 3234640 | 3/1984 | Fed. Rep. of Germany | 123/90.6 |
| 330987 | 10/1935 | Italy | 403/355 |
| 462162 | 2/1951 | Italy | 403/355 |
| 0043051 | 3/1982 | Japan | 74/567 |
| 0070105 | 4/1985 | Japan | 29/156.4 R |
| 0294262 | 4/1985 | Japan | 74/567 |
| 62-2242 | 1/1987 | Japan | 74/567 |
| 191223 | 1/1923 | United Kingdom | 403/355 |
| 1115093 | 5/1968 | United Kingdom | 74/567 |

Primary Examiner—Vinh T. Luong
Attorney, Agent, or Firm—Birch, Stewart, Kolasch & Birch

[57] ABSTRACT

A camshaft comprising a steel shaft and a plurality of cam pieces fitted on the shaft. The cam piece is made from a sintering alloy material and bonded to the shaft by sintering. The shaft has pin-receiving holes perpendicular to the axis of the shift. The cam piece is formed on its side surface with a pin-receiving groove. A positioning pin has a lower portion tightly fitted in the hole of the shaft and an upper portion fitted in the groove to position the cam piece with respect to the shaft during sintering.

1 Claim, 1 Drawing Sheet

CAMSHAFT

This application is a divisional of copending application Ser. No. 07/347,224 filed on May 4, 1989.

BACKGROUND OF THE INVENTION

1. Field of the Invention

The present invention relates to a camshaft of the type having a plurality of cam pieces made from a sintered alloy and bonded to a steel shaft at predetermined positions by sintering.

2. Description of the Prior Art

Sintering alloy powders are molded into a green cam piece provided with a shaft-receiving bore for fitting engagement with a steel shaft. The green cam piece is kept unmoved during sintering by a positioning pin that is inserted into both the radial holes of the green cam piece and the shaft. The green cam piece with the radial hole cannot be fabricated without using a complicated and costly mold die.

It has been proposed by JP Y 62-2242 that each green cam piece is formed on its side surface with a slanting groove and kept unmoved on a steel shaft during sintering by a pin that is fitted in both the inclined hole of the shaft and in the inclined groove of the green cam piece. The proposed cam piece can be molded by a relatively simple and inexpensive die because it has no hole which crosses the shaft-receiving bore. The camshaft has cam pieces secured to the steel shaft at the respective axial positions within a desired tolerance.

However, it is somewhat costly. The disadvantage results from the fact that the steel shaft has pin-receiving holes inclined to its axis, because the inclined holes are not easily machined without special tools.

SUMMARY OF THE INVENTION

In view of the foregoing, it is the principal object of the present invention to provide an improved camshaft that has an axial dimension within a desired tolerance and that is manufactured at a low cost as compared with the above-mentioned camshaft.

The present invention consists in a camshaft comprising a steel shaft, pin-receiving holes formed at predetermined positions on the outer surface of the shaft, positioning pins inserted into the respective pin-receiving holes, cam pieces made from a sintering alloy material and fitted on the shaft, and a pin-receiving groove formed on the side of each cam piece for receiving engagement with the individual pin, the pin-receiving hole being perpendicular to the axis of the shaft and providing a tight contact with the pin.

Advantageously, one of the pin and the hole is tapered while the other is straight. The straight or tapered hole is easily machined in comparison with the known camshaft, since it is perpendicular to the axis of the shaft. The green cam piece is fabricated by the use of an inexpensive die that is simple in construction and endurable for use, because it has no hole crossing the shaft-receiving bore. The positioning pin is easily inserted into the pin-receiving hole by which the pin is tightly held and prevented from slipping out of the shaft, once inserted. The green cam pieces are accurately positioned by the pins.

Advantages offered by the invention are mainly that the cam piece is precisely molded by the simple and inexpensive die and that the shaft is easily machined to have pin-receiving holes formed at predetermined positions. This is due to the pin-receiving groove formed on the side surface of the cam piece for receiving the positioning pin which is inserted into the pin-receiving hole perpendicular to the axis of the shaft. After all, the inventive camshaft has the same dimensional accuracy and is manufactured at a relatively low cost as compared with the known one.

BRIEF DESCRIPTION OF DRAWINGS

The invention will become more fully understood from the detailed description given hereinbelow and the accompanying drawings which are given by way of illustration only, and thus are not limitative of the present invention.

DETAILED DESCRIPTION OF THE INVENTION

Figure 1:
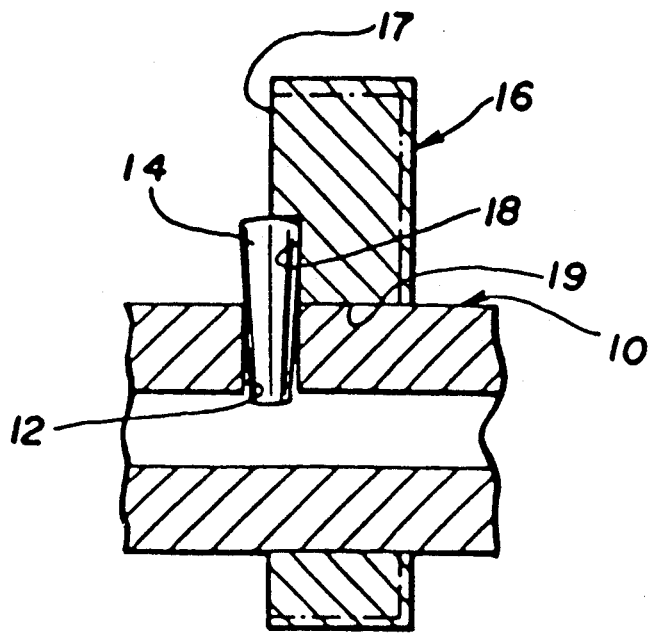
FIG. 1 is a longitudinal section of the relevant portion of the camshaft according to the present invention.

The present invention is described in detail below with reference to drawings which illustrate preferred embodiments. As seen in FIG. 1, a tubular steel shaft 10 has a pin-receiving hole 12 into which a positioning pin 14 is inserted. The hole 12 is straight and perpendicular to the axis of the shaft 10. The pin 14 is so tapered that it makes tight contact with the hole 12 when inserted into the straight hole 12.

Figure 2:
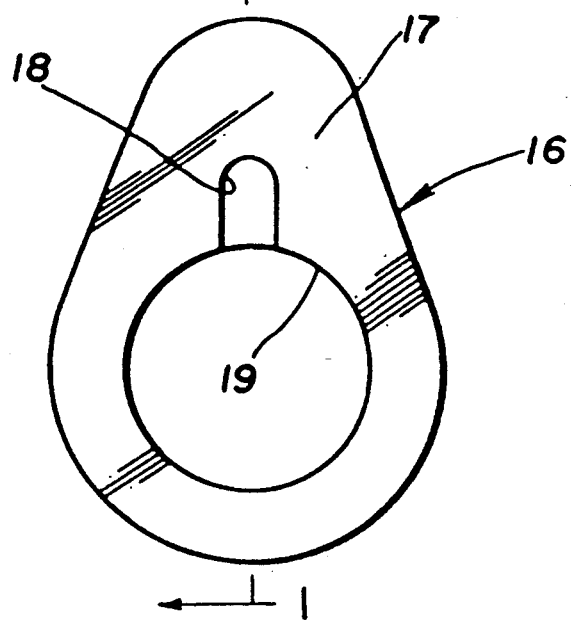
FIG. 2 is a side elevation of the cam piece of FIG. 1.

A cam piece 16 of FIG. 2 is molded as a green compact from sintering alloy powders and then fitted on the shaft 10 or pre-sintered prior to being fitted on the shaft. When the green cam piece 16 is molded, the pin-receiving groove 18 is also formed to extend radially from the shaft-receiving bore 19 on the side surface 17 of the cam piece.

As seen in FIG. 1, the positioning pin 14 has its upper portion fitted in the pin-receiving groove 18 to determine both of the axial and peripheral positions of the green cam piece 16 with respect to the shaft 10. Thereafter, the assembly of the green cam pieces and the steel shaft is treated in a sintering furnace where the cam pieces are fixedly bonded to the shaft by sintering. The positioning pin 14 is tightly inserted into the pin-receiving hole 12 in a manner that it can not loosen nor slip from the hole. The pin 14 is also fitted in the groove 18 to hold the cam piece 16 exactly at a predetermined position. The groove 18 is entirely exposed on the side surface 17 of the cam piece 16, so that the green cam piece can be fabricated by a molding die which is simple in construction. It is well known that a simple die brings products with a high accuracy and is usable for a long time. The hole 12 is perpendicular to the axis of the shaft 10 so that it is easily bored by machining. The machining cost of providing the shaft with the perpendicular holes is remarkably reduced as compared with that of providing the shaft with the slanting holes. Accordingly, the inventive camshaft is manufactured at a lower cost than the known camshaft.

Figure 3:
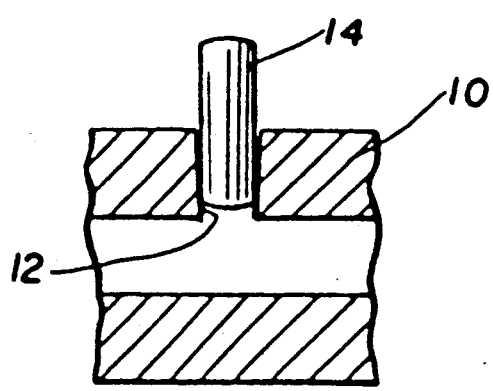
FIGS. 3 and 4 are sections of different embodiments, illustrating the positioning pin fitted in the pin-receiving hole.
Figure 4:
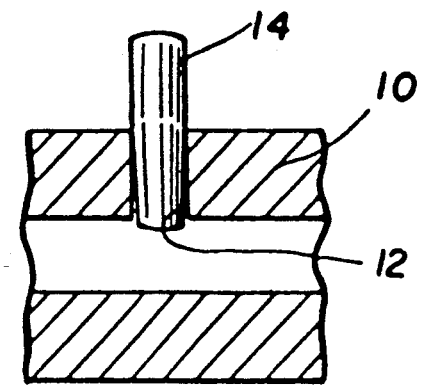

As seen in FIG. 3, the steel shaft 10 can be formed with tapered hole 12, while the positioning pin 14 is straight and has a diameter slightly larger than the minimum diameter of the hole 12. The straight pin 14 is tightly inserted into the tapered hole 12. As seen in FIG. 4, the positioning pin 14 may have an upper straight portion and a lower tapered portion. The upper straight portion has a diameter equal to the maximum diameter of the lower portion. The steel shaft 10 has the straight pin-receiving hole 12 of which the diameter is smaller than the maximum diameter of the lower portion and larger than the minimum diameter of the lower portion. The pin 14 has its tapered lower portion tightly inserted into the straight hole 12.

In brief, the pin 14 makes circular contact with the hole 12 and is tightly held by the hole. It is easy to insert the positioning pin 14 into the hole 12. The manufacturing of the inventive camshaft needs neither special tools nor skilled workers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A camshaft comprising
   a steel shaft,
   at least one pin-receiving hole formed in the outer surface of said shaft and perpendicular to the axis of said shaft,
   cam pieces made from a sintering alloy material and secured to said shaft by sintering,
   a pin-receiving groove formed in the side surface of each of said cam pieces,
   a positioning pin having a lower portion inserted into and tightly held by each of said holes and an upper portion fitted in said pin-receiving groove to define the axial and peripheral portions of said cam pieces on said shaft when said cam piece is sintered,
   said positioning pin having a straight configuration and said pin-receiving hole having a tapered configuration.

* * * * *